United States Patent [19]

Itami et al.

[11] Patent Number: 5,612,599

[45] Date of Patent: Mar. 18, 1997

[54] DC BRUSHLESS MOTOR DRIVING DEVICE, DC BRUSHLESS MOTOR, AND IMAGE FORMING DEVICE USING THE DRIVING DEVICE AND BRUSHLESS MOTOR

[75] Inventors: Yukio Itami; Mitsuo Suzuki, both of Yokohama, Japan

[73] Assignee: Ricoh Company, Ltd., Tokyo, Japan

[21] Appl. No.: 427,021

[22] Filed: Apr. 24, 1995

[30] Foreign Application Priority Data

Apr. 25, 1994 [JP] Japan .................................. 6-086224

[51] Int. Cl.⁶ .................................................. H02P 6/00
[52] U.S. Cl. .......................... 318/254; 318/599; 318/696
[58] Field of Search ..................................... 318/138, 245, 318/254, 685, 696, 38, 34–90, 805, 806, 799, 809, 439; 307/66; 363/37; 388/800–811

[56] References Cited

U.S. PATENT DOCUMENTS

| | | | |
|---|---|---|---|
| 3,750,000 | 7/1973 | Bruckner et al. | 318/696 |
| 3,989,992 | 11/1976 | Schmidt | 318/257 |
| 4,005,347 | 1/1977 | Erdman | 318/254 |
| 4,169,990 | 10/1979 | Lerdman | 318/138 |
| 4,533,861 | 8/1985 | Rogers et al. | 318/696 |
| 4,638,223 | 1/1987 | Tajima et al. | 318/254 |
| 5,017,800 | 5/1991 | Divan | 307/66 |
| 5,027,048 | 6/1991 | Masrur et al. | 318/806 |

FOREIGN PATENT DOCUMENTS 58-99289  6/1983  Japan .

Primary Examiner—Paul Ip
Attorney, Agent, or Firm—Lowe, Price, LeBlanc & Becker

[57] ABSTRACT

A device for driving a DC motor includes a velocity control circuit generating a velocity control signal, a modulation circuit deriving a velocity control pulse signal having a pulse width modulated by the velocity control signal, a switching circuit, and a current-flow switching circuit. The switching circuit includes field effect transistors performing a switching operation, and a capacitor coupled between a power supply terminal and a reference potential. The capacitor absorbs a counter current caused in driving coils of the DC motor due to the switching operation.

18 Claims, 18 Drawing Sheets

FIG. 11

| | | TURN-ON TIME (Ton) | TURN-OFF TIME (Toff) |
|---|---|---|---|
| MOS FET | Nch | 0.015 μsec | 0.200 μsec |
| | Pch | 0.050 μsec | 0.120 μsec |
| BIPOLAR TRANSISTOR | NPN | 0.5 μsec | 7.0 μsec |
| | PNP | 0.6 μsec | 2.1 μsec | ns
DC BRUSHLESS MOTOR DRIVING DEVICE, DC BRUSHLESS MOTOR, AND IMAGE FORMING DEVICE USING THE DRIVING DEVICE AND BRUSHLESS MOTOR

BACKGROUND OF THE INVENTION

1. Field of the Invention

The present invention generally relates to DC brushless motors and devices for driving the same. More particularly, the present invention is concerned with a DC brushless motor suitable for driving a high-speed polygon mirror used to scan a light beam in an image forming device such as a laser beam printer, a digital copying machine or a digital facsimile machine.

2. Description of the Related Art

A DC brushless motor driving device for controlling the rotation velocity of a DC brushless motor is known in which currents flowing in driving coils of the DC motor are turned ON and OFF with a period less than the period of a rotor position detecting signal. Such a DC brushless motor driving device is disclosed in, for example, Japanese Laid-Open Patent Application No. 58-99289. The proposed driving device is principally capable of efficiently driving the DC motor. A conventional DC brushless motor driving device such as disclosed in the above application will now be described in more detail by referring to FIG. 1.

FIG. 1 is a block diagram of the overall structure of such a conventional DC brushless motor driving device. The driving device shown in FIG. 1 is made up of a velocity control circuit 101, a pulse width modulation circuit 102, a current flow switching circuit 103, a switching circuit 104, and a current smoothing circuit 105. The velocity control circuit 101 compares the current velocity obtained from one of three position detecting signals with a target velocity, and produces the difference therebetween as a velocity control voltage. The pulse width modulation circuit 102 modulates the pulse width of a velocity control pulse signal in accordance with the velocity control voltage supplied from the velocity control circuit 101.

The current smoothing circuit 105 smooths the velocity control pulse signal from the pulse width modulation circuit 102 and produces a resultant DC driving current. The switching circuit 104 distributes the driving current to the driving coils of a DC brushless motor 106 having three phases in accordance with current-flow switching signals produced by the current-flow switching circuit 103. The circuit 103 derives the current-flow switching signals from the three position detecting signals from the motor 106.

The current smoothing circuit 105 is utilized due to consideration of the following operating characteristic of the motor.

The high-frequency switching operation on the current sequentially flowing in the driving coils of the motor 106 results in a counter electromotive force when the switching is turned OFF. The counter electromotive force can be expressed as follows:

$$V = -L(di/dt) \quad (1)$$

where V is the counter electromotive force, L is the inductance of the driving coil, and i is the current flowing in the driving coil.

The counter electromotive force V, produced when the supply of the current flowing in the driving coil of the motor is stopped, is increased as the switching speed (frequency) is increased. In practice, the counter electromotive force V may pass through a diode used to protect switching elements formed of bipolar transistors in the counter direction and may flow into a power supply. The above counter current resulting from the counter electromotive force V causes the driving device to malfunction.

The current smoothing circuit 105 is used to smooth the velocity control pulse signal which is a high-frequency signal and produce the resultant DC current. Hence, it is possible to control the counter current to flow into the power supply and ensure normal driving operation.

FIG. 2 is a circuit diagram of the current smoothing circuit 105 shown in FIG. 1. The current smoothing circuit 105 shown in FIG. 2 is made up of a choke coil CH, a diode D and a capacitor C. The combination of these parts of the circuit 105 function to smooth the velocity control pulse signal and output the smoothed driving current (DC current).

However, use of the choke coil CH and the capacitor C increases the production cost. Further, the choke coil CH and the capacitor C are large-size elements, which prevent down-sizing of the driving device.

Referring to FIG. 3, a motor scanner 120 includes the DC motor 106 and a polygon mirror 110. The motor scanner 120 is controlled by a DC motor driving device 107 configured as shown in FIG. 1 and connected to the motor scanner 120 via a harness 109 or the like. Since the driving device 107 includes the current smoothing circuit 105, it is necessary to separately form the motor scanner 120 and the driving circuit 107. The driving circuit 107 shown in FIG. 3 is implemented by two IC devices IC1 and IC2 mounted on a circuit board 108B as well as the choke coil CH, the capacitor C and the diode D of the current smoothing circuit 105 is also mounted thereon.

SUMMARY OF THE INVENTION

It is an object of the present invention to provide a less-expensive, down-sized DC brushless motor driving device capable of preventing a counter current from flowing to a power supply in the counter direction without smoothing a high-frequency pulse-like motor driving current by means of a choke coil, a capacitor and a diode used in the manner of the prior art.

This object of the present invention is achieved by a device for driving a DC motor including: a velocity control circuit generating a velocity control signal based on a difference between a target velocity of the DC motor and a current velocity thereof; a modulation circuit deriving a velocity control pulse signal having a pulse width modulated by the velocity control signal; a switching circuit performing a switching operation in which a driving current in a pulse formation corresponding to the velocity control pulse signal is sequentially applied to driving coils of the DC motor from a power supply terminal to which a power supply voltage is applied in accordance with a switching signal; and a current-flow switching circuit generating the switching signal on the basis of a current position of a rotator of the DC motor. The switching circuit includes: field effect transistors performing the switching operation; and a capacitor coupled between the power supply terminal and a reference potential, the capacitor absorbing a counter current caused in the driving coils due to the switching operation.

According to an aspect of the present invention, the pulse width modulation circuit includes a limiter circuit which makes the velocity control pulse signal have a pulse width less than that corresponding to the difference when the driving current flowing in the driving coils is greater than a reference value.

According to another aspect of the present invention, the pulse width modulation circuit includes a circuit which makes the velocity control pulse signal have a pulse width which gradually increases after the DC motor is started by applying the driving current to the driving coils.

According to another aspect of the present invention, the device includes a charge/discharge circuit which charges and discharges input capacitances coupled between gates and sources of the field effect transistors.

According to another aspect of the present invention, the above charge/discharge circuit includes first resistors connected to the gates of the field effect transistors and the power supply terminal, and second resistors connected to the gates of the field effect transistors and the reference potential.

According to another aspect of the present invention, the velocity control circuit, the pulse width modulation circuit and the current-flow switching circuit are driven by another power supply voltage different from that applied to the power supply terminal.

According to another aspect of the present invention, a modulation frequency, at which the pulse width of the velocity control pulse signal is modulated by the velocity control signal, is approximately 20 kHz.

Another object of the present invention is to provide a compact DC brushless motor having a motor main body housed together with the driving device.

This object of the present invention is achieved by a DC motor including: a DC motor main body; a circuit board to which the DC motor main body is supported; and a device that drives the DC motor main body and is mounted on the circuit board. The driving device is configured as described above.

According to an aspect of the present invention, the capacitor of the switching circuit is mounted on the circuit board and is located below the DC motor main body.

According to another aspect of the present invention, the motor further includes a polygon mirror attached to a shaft of the DC motor main body.

A further object of the present invention is to provide an image forming device including the above DC brushless motor and its driving device.

This object of the present invention is achieved by an image forming device including: a photosensitive member; and an optical system that forms an image on the photosensitive member by projecting a light beam thereon. The optical system includes: a light source; a polygon mirror reflecting the light beam emitted from the light source; and a DC motor rotating the polygon mirror. The above DC motor is configured as described above.

BRIEF DESCRIPTION OF THE DRAWINGS

Other objects, features and advantages of the present invention will become more apparent from the following detailed description when read in conjunction with the accompanying drawings, in which:

FIG. 11 is a diagram showing response characteristics of a bipolar transistor and a MOS field effect transistor;

DESCRIPTION OF THE PREFERRED EMBODIMENTS

Figure 2:
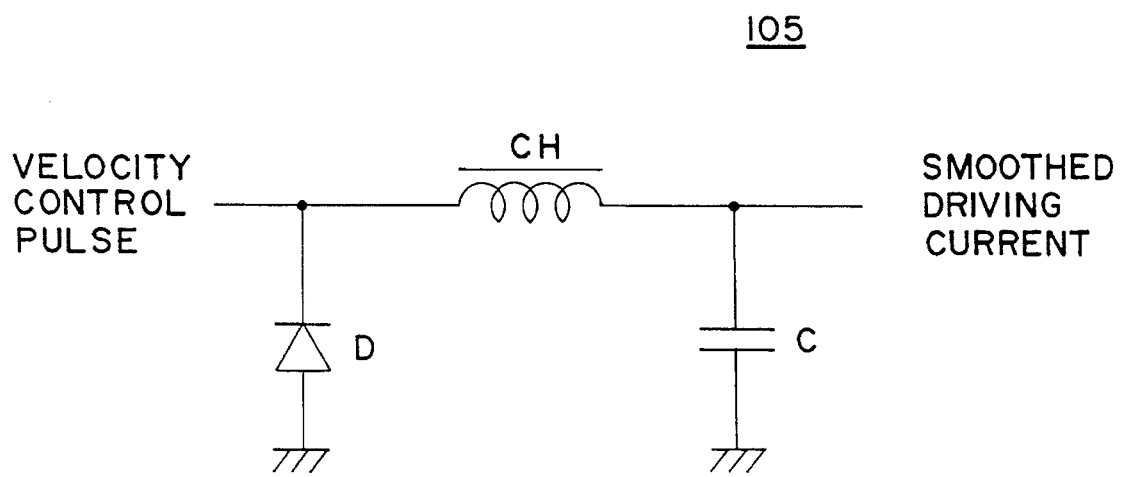
FIG. 2 is a circuit diagram of a current smoothing circuit shown in FIG. 1.
Figure 3:
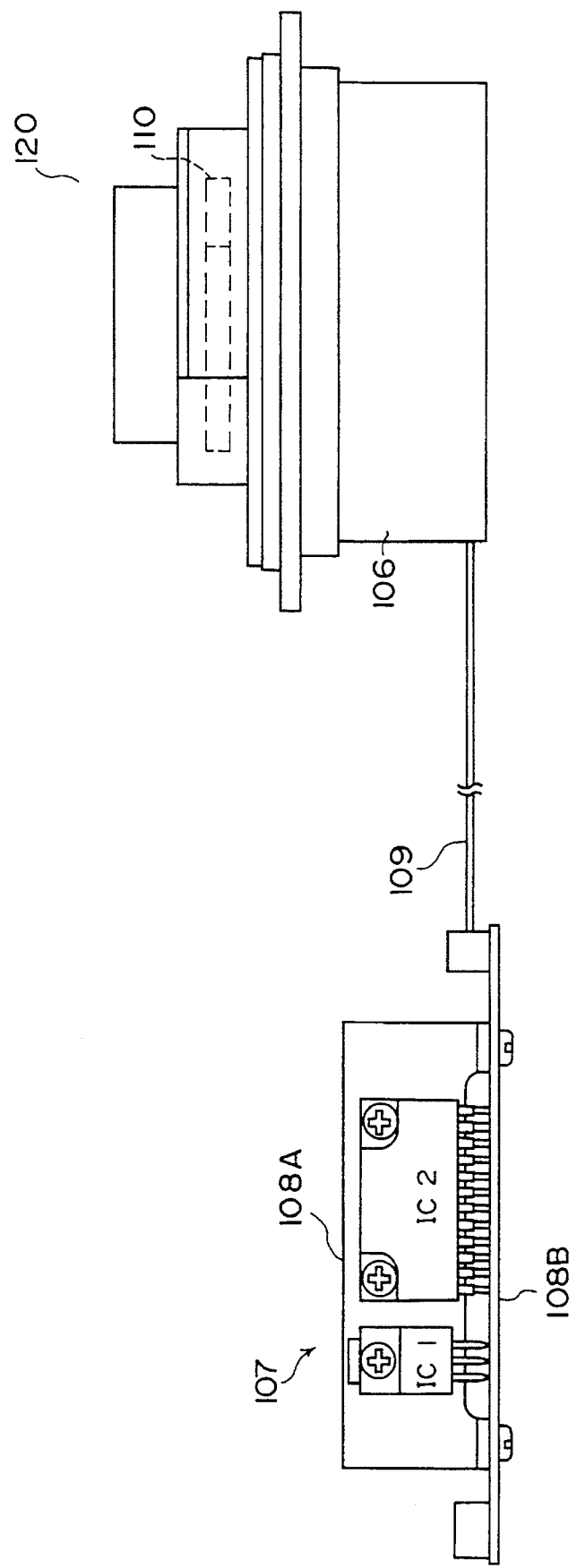
FIG. 3 is a side view of a DC brushless motor and its driving device.
Figure 4:
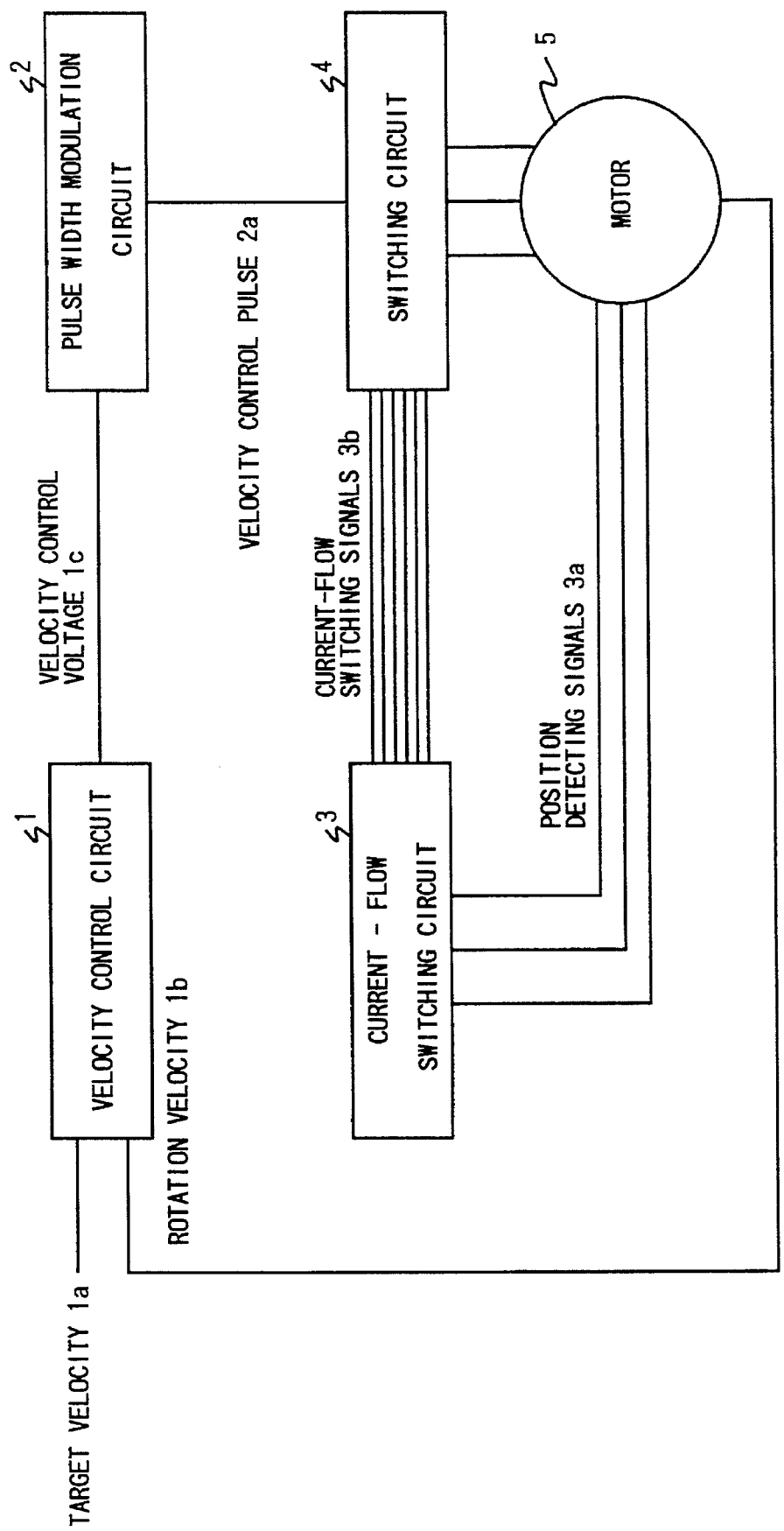
FIG. 4 is a block diagram of a DC brushless motor driving device according to an embodiment of the present invention.

Referring to FIG. 4, there is illustrated a DC brushless motor driving device according to an embodiment of the present invention. The device shown in FIG. 4 controls a motor 5 having three phases, and includes a velocity control circuit 1, a pulse width modulation circuit 2, a current-flow switching circuit 3, and a switching circuit 4. It is to be noted that the device shown in FIG. 4 does not have any current smoothing circuit of the type shown in FIGS. 2 and 3.

More particularly, the velocity control circuit 1 compares a target velocity signal 1a and a rotation velocity signal 1b obtained by monitoring a revolution of the motor 5 with each other and produces a velocity control voltage signal 1c based on the comparison result. The pulse width modulation circuit 2 derives a velocity control pulse signal 2a from the velocity control voltage signal 1c output by the velocity control circuit 1 so that the velocity control pulse signal 2a has a pulse width corresponding to the velocity control voltage signal 1c. The current-flow switching circuit 3 derives current-flow switching signals 3b from position detecting signals 3a indicating the position of a rotator of the DC motor 5. The switching circuit 4 makes driving currents flowing in the three coils of the motor 5 on the basis of the current-flow switching signals 3b and the velocity control pulse signal 2a. Accordingly, the switching of each of the driving currents during a driving period is repeatedly carried out with a period corresponding to the pulse width of the velocity control pulse signal 2a.

A description will now be given of the circuits 1 through 4 shown in FIG. 4.

Figure 5:
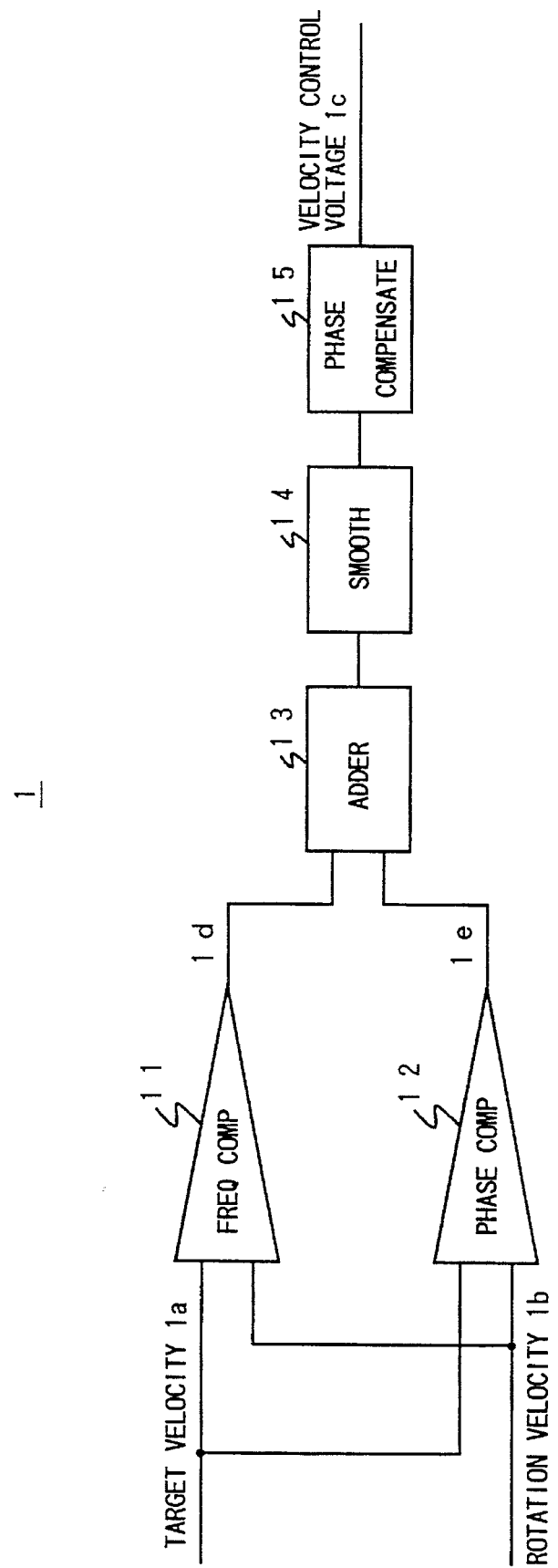
FIG. 5 is a block diagram of a velocity control circuit shown in FIG. 4.

FIG. 5 is a block diagram of the velocity control circuit 1 shown in FIG. 4. The circuit 1 shown in FIG. 5 is made up of a frequency comparator 11, a phase comparator 12, an adder 13, a smoothing circuit 14 and a phase compensation circuit 15. The target velocity signal 1a applied to the comparators 11 and 12 is a highly precise reference clock signal, which can be produced by, for example, a crystal oscillator. The rotation velocity signal 1b applied to the comparators 11 and 12 is obtained by, for example, amplifying an output signal of a frequency generator or Hall elements (not shown for the sake of simplicity) and shaping the waveform of the amplified output signal. The above output signal is proportional to the rotational velocity of the rotator of the DC motor 5. The frequency comparator 11 outputs an error signal 1d based on the difference between the frequency of the target velocity signal 1a and the rotation velocity signal 1b. The phase comparator 12 outputs an error signal 1e based on the difference between the phases of the signals 1a and 1b.

The above two error signals are added by the adder 13, and a resultant error signal is smoothed by the smoothing circuit 14. Finally, the phase of the smoothed error signal is adjusted by the phase compensation circuit 15, which results in the velocity control voltage 1c.

Figure 6:
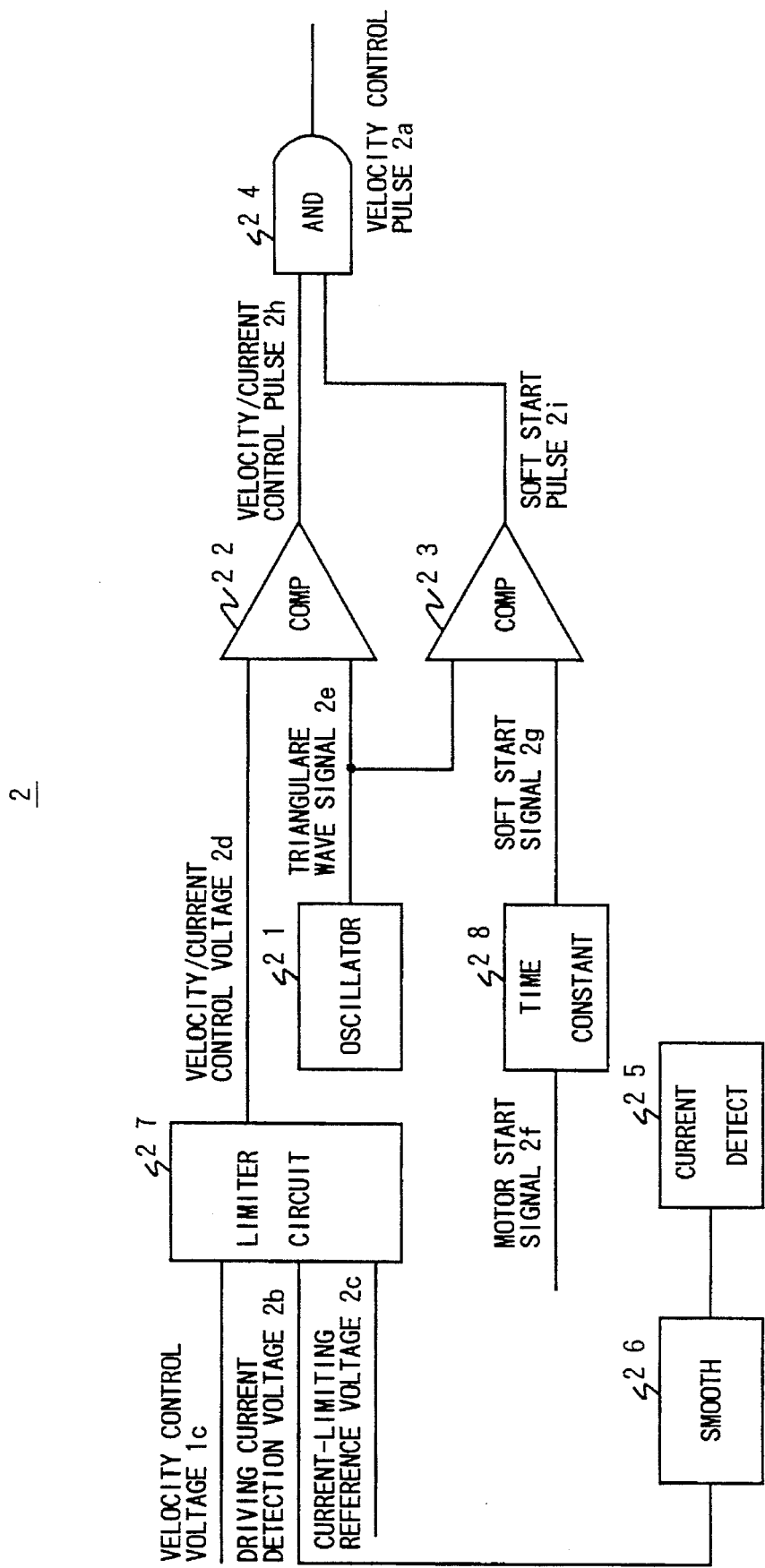
FIG. 6 is a block diagram of a pulse width modulation circuit shown in FIG. 4.

FIG. 6 is a block diagram of the pulse width modulation circuit 2 shown in FIG. 4. The circuit 2 shown in FIG. 6 is made up of a limiter circuit 27, an oscillator circuit 21, comparators 22 and 23, an AND gate 24, a current detection circuit 25, a smoothing circuit 26 and a time constant circuit 28.

The current detection circuit 25 detects the driving current flowing in the coils of the DC motor 5. The detected driving current is smoothed by the smoothing circuit 26, which produces a resultant driving current detection voltage 2b. The limiter circuit 27 receives, in addition to the above driving current detection voltage 2b, the velocity control voltage 1c from the velocity control circuit 1 shown in FIG. 4, and a current limiting reference voltage 2c. This voltage 2c can be produced by, for example, a voltage dividing resistor network to which a power supply voltage is applied.

When the driving current detection voltage 2b is lower than the current limiting reference voltage 2c, the limiter circuit 27 allows the velocity control voltage 1c to pass therethough. In this case, the driving current is less than a reference current value corresponding to the current limiting reference voltage 2c, and there is thus a need to limit the driving current. If the driving current detection voltage 2b is equal to or higher than the current limiting reference voltage 2c, the limiter circuit 27 invalidates the velocity control voltage 1c, and instead outputs a current limiting control voltage that has a limited pulse width. In this case, the driving current flowing in the coils of the motor 5 is limited. The use of the above driving current limiting operation results in advantages that will be described later.

It is to be noted that use of the current detection circuit 25, the smoothing circuit 26 and the limiter circuit 27 is optional, but it is preferable to employ the driving current limiting operation.

The output signal of the limiter circuit 27, which will hereinafter be referred to as a velocity/current control voltage 2d, is applied to the comparator 22, which receives a triangular wave or saw-tooth signal 2e generated by the oscillator circuit 21. The comparator 22 compares the two input signals, and produces a velocity/current control pulse signal 2h based on the comparison result. In other words, the velocity/current control voltage 2d is modulated by the triangular wave signal 2e. The oscillation frequency corresponds to the modulation frequency, which has a shorter period than that of the aforementioned position detecting signals 3a.

The time constant circuit 28, the comparator 23 and the AND gate 24 are provided in order to prevent a large driving current from flowing in the coils of the motor 5 when initiating the motor 5. At the commencement of rotation of the motor 5, the velocity/current control pulse signal has a maximum pulse width, which causes a large driving current to flow in the coils of the motor 5. During the initial period after the motor 5 is activated, a limited pulse signal is applied to the switching circuit 4 instead of the velocity/current control pulse signal 2h.

The time constant circuit 28 derives a soft start signal 2g from a motor start signal 2f. The motor start signal 2f is supplied from, for example, a controller of a system to which the motor driving device is applied. The soft start signal 2g is a voltage signal which gradually increases. The comparator 23 modulates the triangular wave signal 2e by the soft start signal 2g so that a soft start pulse signal 2i can be generated in which the pulse width of the sort start pulse signal 2i is gradually increased. The AND gate 24 performs the AND operation on the pulse signals 2h and 2i, and produces a resultant pulse signal that functions as the aforementioned velocity control pulse signal 2a.

It is to be noted that use of the comparator 23, the AND gate 24 and the time constant circuit 28 is optional, but it is preferable to employ the soft starting operation.

Figure 7:
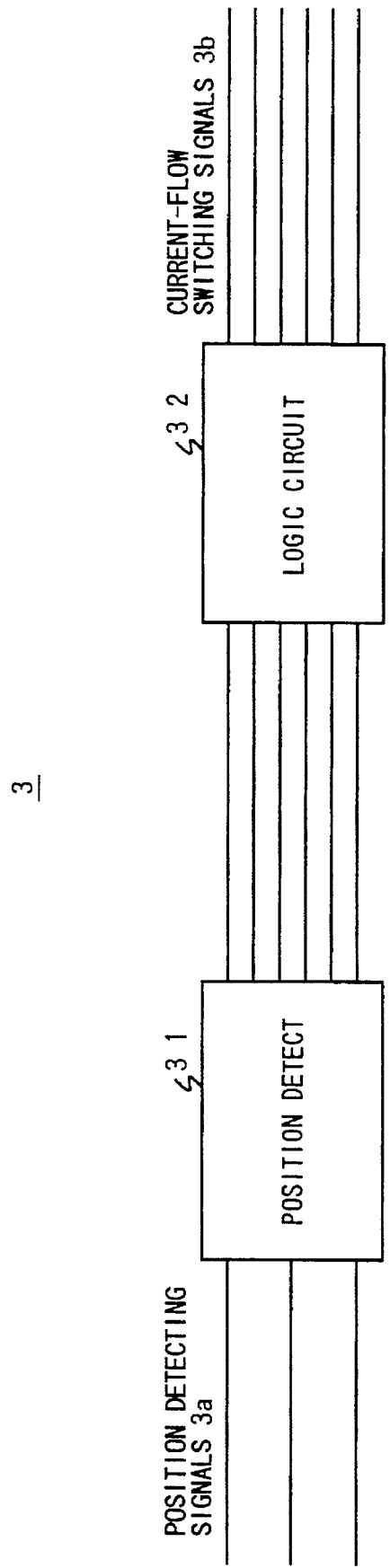
FIG. 7 is a block diagram of a current-flow switching circuit shown in FIG. 4.

FIG. 7 is a block diagram of the current flow switching circuit 3 shown in FIG. 4. The circuit 3 is made up of a position detecting circuit 31, and a logic circuit 32. The position detecting circuit 31 performs a known position detecting operation on the position detecting signals 3a from the Hall elements or the like provided in the vicinity of the three coils of the DC motor 5. Then, the position detecting circuit 31 produces resultant signals showing the result of the position detecting operation, these signals being applied to the logic circuit 32. Then, the logic circuit 32 performs a known logic operation on the received signals, and generates the current-flow switching signals 3b.

Figure 8:
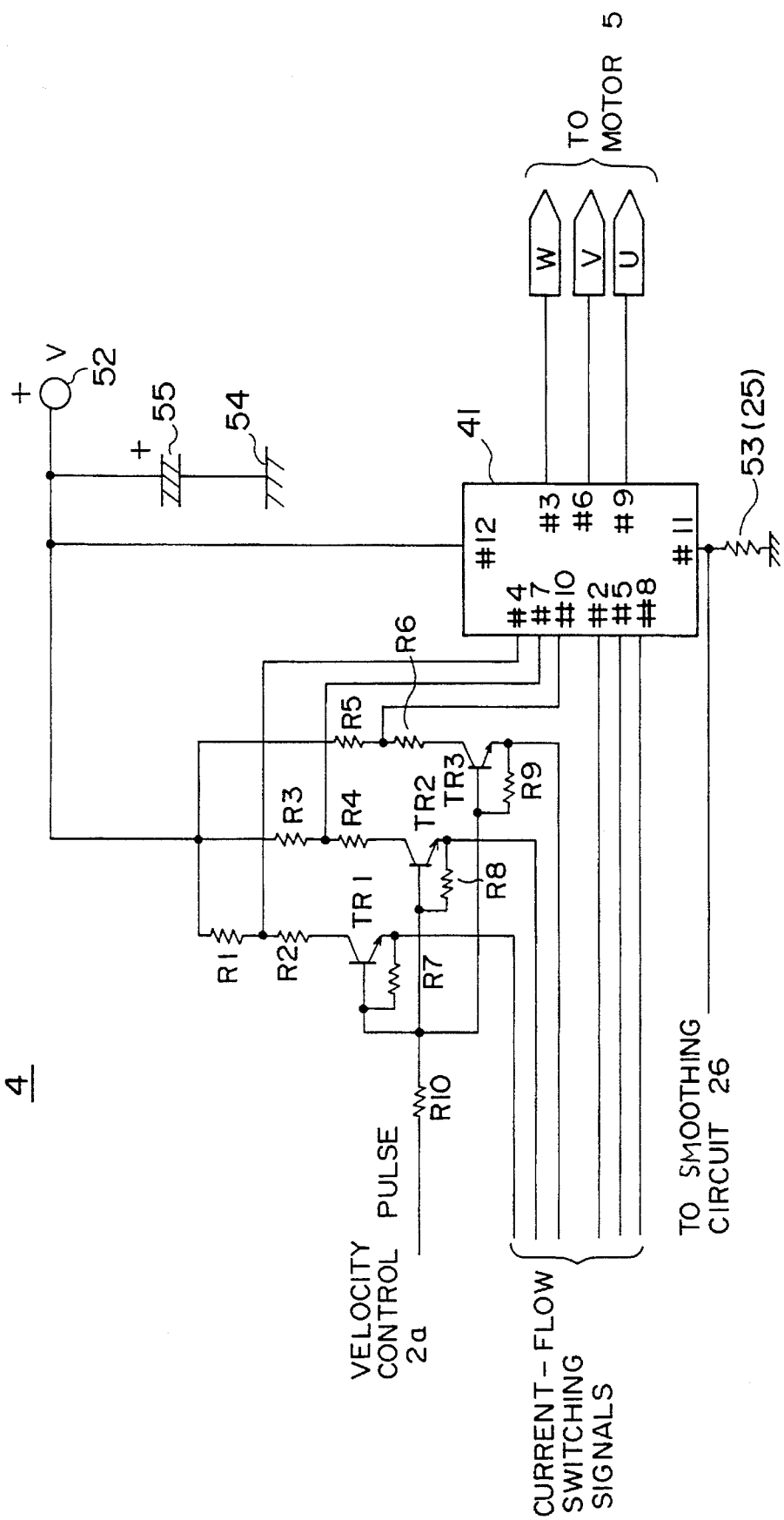
FIG. 8 is a circuit diagram of a switching circuit shown in FIG. 4.

FIG. 8 is a block diagram of the switching circuit 4 shown in FIG. 4. The switching circuit 4 includes bipolar transistors TR1, TR2 and TR3, a switching unit 41 and a capacitor 55. A power supply voltage V is applied to a power supply terminal 52. A series circuit of resistors R1 and R2 is connected between the collector of the transistor TR1 and the power supply terminal 52. A series circuit of resistors R3 and R4 is connected between the collector of the transistor TR2 and the power supply terminal 52. A series circuit of resistors R5 and R6 is connected between the collector of the transistor TR3 and the power supply terminal 52. Resistors R7, R8 and R9 are used to bias the transistors TR1, TR2 and TR3.

The power supply voltage V is applied to the plus terminal of the capacitor 55, the minus terminal thereof being grounded as indicated by reference number 54. The power supply voltage V is applied to terminal #12 of the switching unit 41, and terminal #11 thereof is grounded via a resistor 53.

The velocity control pulse signal 2a is applied to the bases of the transistors TR1, TR2 and TR3 via the resistor R10.

The three current-flow switching signals 3b are applied to the emitters of the transistors TR1, TR2 and TR3. As will be described later, the three current-flow switching signals 3b sequentially turn ON the transistors TR1, TR2 and TR3 one by one. The collectors of the transistors TR1, TR2 and TR3 are coupled to terminals #4, #7 and #10 of the switching unit 41 via the resistors R2, R4 and R6, respectively. The transistors TR1, TR2 and TR3 control the potentials of terminals #4, #7 and #10 in accordance with the velocity control pulse signal 2a.

The remaining three current-flow switching signals 3b, which have different phases from those of the signals 3b applied to the transistors TR1, TR2 and TR3, are respectively applied to terminals #2, #5 and #8 of the switching unit 41. Terminals #3, #6 and #9 are respectively connected to coils W, V and U of the DC motor 5. Terminal #12 is selectively connected to terminals #3, #6 and #9, and the driving current via the power supply terminal 52 flows in the motor coils. As indicated earlier, the resistor 53 is connected between terminal #11 of the switching unit 41 and the ground. The resistor 53 functions as the aforementioned current detection circuit 25.

The capacitor 55 is, for example, a high ripple current type capacitor capable of treating (charging and discharging) a high ripple current caused by high-frequency switching. The high ripple current type capacitor has a low high-frequency impedance. The capacitor 55 plays an important role in the DC motor driving device being considered. This will be described below by referring to FIG. 9 that shows the structure of the switching unit 41.

Figure 9:
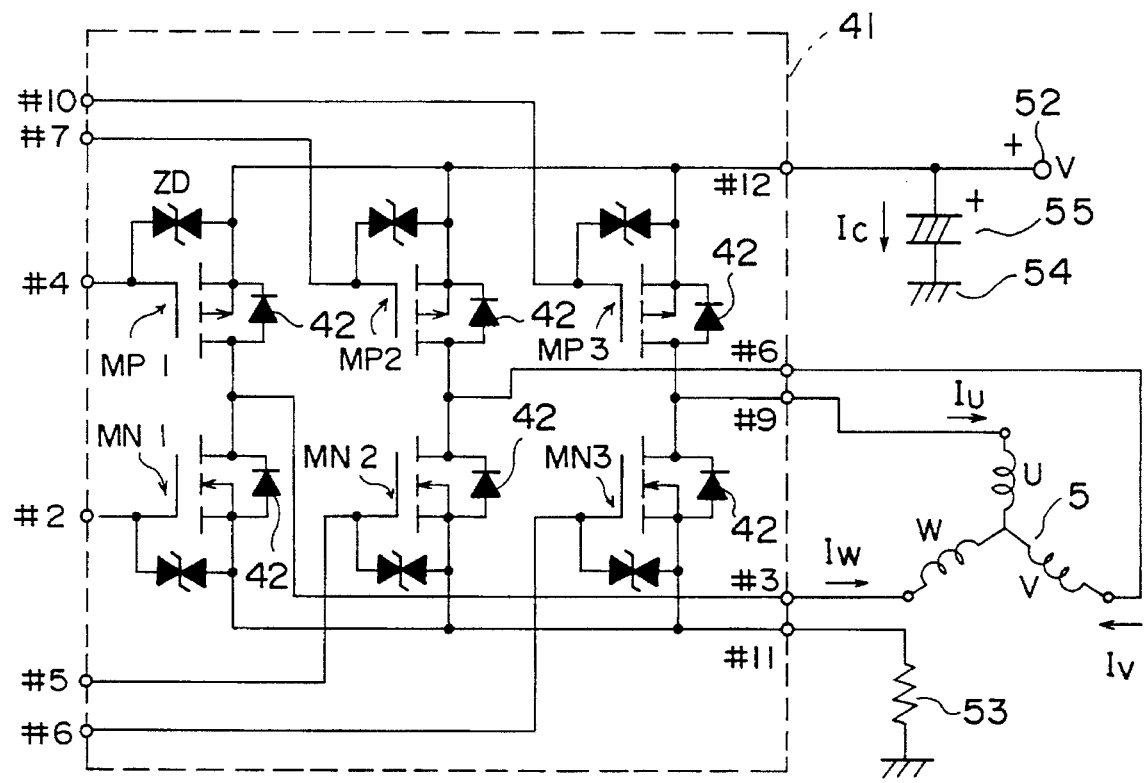
FIG. 9 is a circuit diagram of a switching unit shown in FIG. 8.

Referring to FIG. 9, the switching unit 41 includes P-channel field effect transistors MP1, MP2 and MP3, and N-channel field effect transistors MN1, MN2 and MN3. These transistors are, for example, MOS transistors. The sources of the transistors MP1, MP2 and MP3 are connected to the power supply terminal 52, and the drains thereof are connected to terminals #3, #6 and #9 as well as the drains of the transistors MN1, MN2 and MN3, respectively. The gates of the transistors MP1, MP2 and MP3 are supplied with the velocity control pulse signal 2a via terminals #4, #7 and #10, respectively. The sources of the transistors MN1, MN2 and MN3 are grounded via terminal #11 and the resistor R53, and the gates thereof are supplied with the current-flow switching signals 3b via terminals #2, #5 and #8, respectively.

Diodes 42 are connected between the drains and sources of the transistors MP1, MP2 and MP3, as shown in FIG. 9, and similarly diodes 42 are connected between the drains and sources of the transistors MN1, MN2 and MN3. The diodes 42 function to protect the associated transistors. Symbol ZD indicates a Zener diode for protecting the corresponding transistor from an excessive voltage across the gate and source. When a voltage greater than a given voltage is applied across the gate and source, current passes through the Zener diode to thus prevent the transistor being damaged.

As will be described later, while one of the transistors MN1, MN2 and MN3 is ON, one of the transistors MP1, MP2 and MP3 performs the switching operation, so that the driving current supplied from the power supply via the terminal 52 flows in one of the above-described transistors MP1, MP2 and MP3, two of the three motor coils U, V and W and the above one of the transistors MN1, MN2 and MN3.

Figure 1:
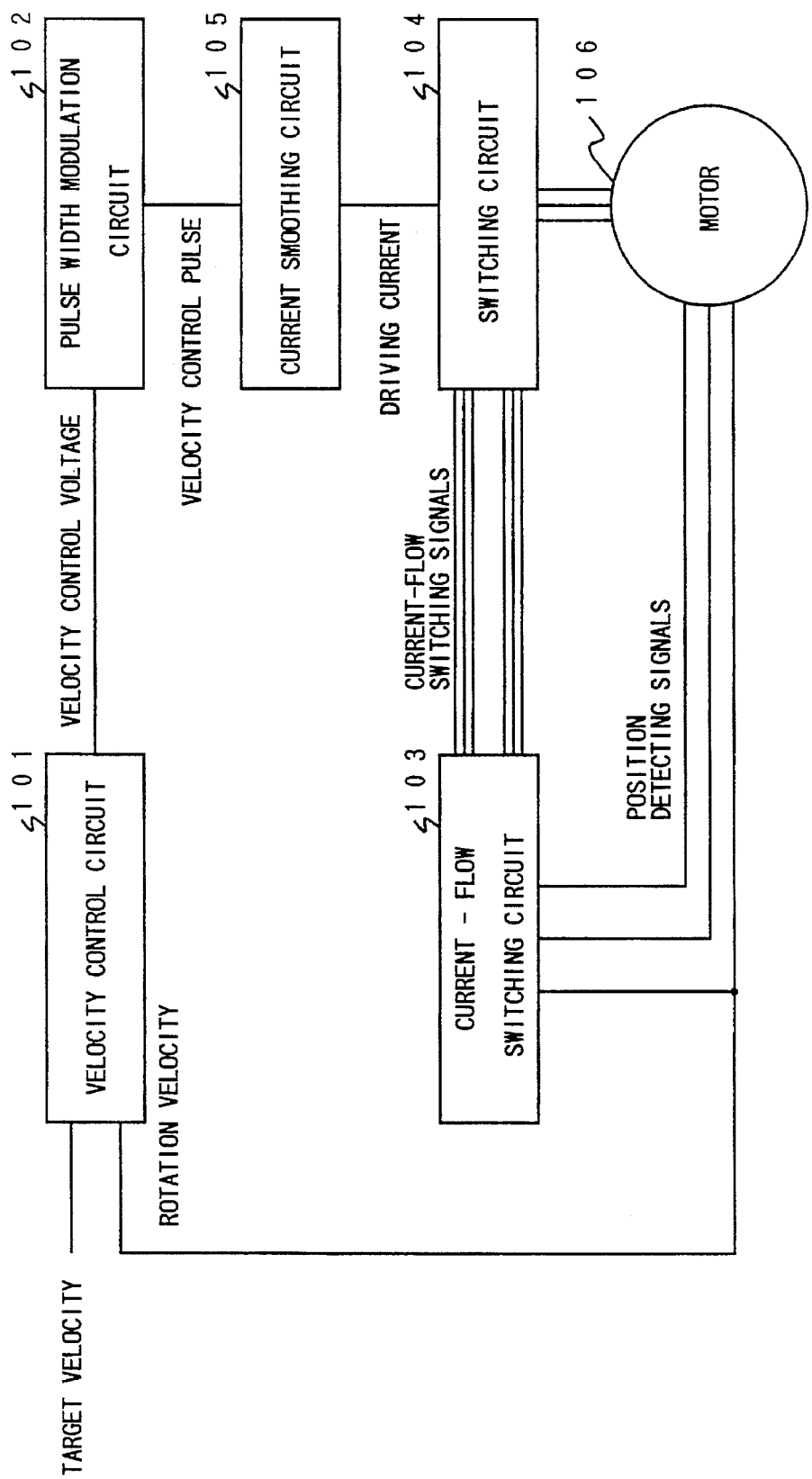
FIG. 1 is a block diagram of a conventional DC brushless motor driving device.

It should be noted that the switching unit 41 is configured by using the field effect transistors, while a conventional corresponding switching unit as disclosed in Japanese Laid-Open Patent Application No. 58-99289 is formed by bipolar transistors. That is, the switching circuit 104 shown in FIG. 1 is formed by bipolar transistors.

Figure 10:
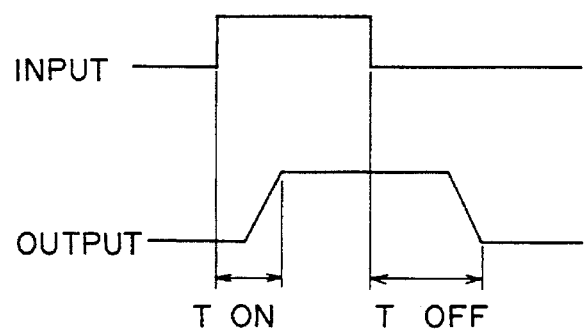
FIG. 10 is a waveform diagram of an input/output response of a bipolar transistor.

FIG. 10 is a waveform diagram of the switching operation of a bipolar transistor. The bipolar transistor is a current-driven type transistor and has a turn-ON time and a turn-OFF time, as shown in FIG. 10.

FIG. 11 is a diagram showing the switching response of the bipolar transistor and the switching response of the MOS field effect transistor. It will be apparent from FIGS. 10 and 11 that the switching response of the bipolar transistor is not as fast as that of the field effect transistor. Particularly, the bipolar transistor has a long turn-OFF time (delay) due to a charge stored in the transistor. The delay caused by the stored charge is increased as the magnitude of the current flowing in the bipolar transistor is increased. When a large current flows in the bipolar transistor, a large amount of heat is generated and the efficiency of the bipolar transistor is degraded. For the above reasons, the bipolar transistor is not suitable for high-speed switching of a large current.

On the other hand, the field effect transistor is a voltage-driven transistor and the switching speed thereof is as fast as ten times that of the bipolar transistor or more. That is, the field effect transistor is suitable for high-speed switching of a large current. With the above in mind, the switching unit 41 shown in FIG. 9 is configured by the field effect transistors.

Further, it is to be noted that the transistors MP1, MP2 and MP3 are switched over by the velocity control pulse signal 2a applied thereto via the transistors TR1, TR2 and TR3. That is, the DC motor driving circuit of the present invention does not have the current smoothing circuit 105 shown in FIGS. 1 and 2. Hence, the high-frequency switching operation on the driving current flowing in the coils of the motor 5 causes a counter electromotive force when supply of the driving current is stopped. As defined by the aforementioned equation (1), the counter electromotive force becomes larger as the switching frequency becomes higher. As a result, counter currents pass through the diodes 42 and enter the power supply (not shown) via the power supply terminal 52. This may cause a malfunction of the DC motor driving device or may destroy the power supply.

In order to avoid the above problem, the capacitor 55 is provided between the power supply terminal 52 and the ground 54. In response to the high-frequency switching operation on the driving current, the capacitor 55 is repeatedly charged and discharged. That is, the capacitor 55 functions as a tank circuit. The counter current caused by the counter electromotive force is absorbed in the capacitor 55, which is then charged up. The charge stored in the capacitor 55 is discharged when the supply of the driving current is started. In this way, the charging and discharging operation on the capacitor 55 is repeatedly carried out during the switching operation on the driving current. As described above, use of the capacitor 55 prevents the counter current from flowing into the power supply to thereby improve the reliability of the motor driving device and avoids the chock coil CH, the capacitor C and the diode D of the smoothing circuit 105 shown in FIG. 2. Hence, down-sizing and cost reduction of the motor driving device are achieved.

Figure 12:
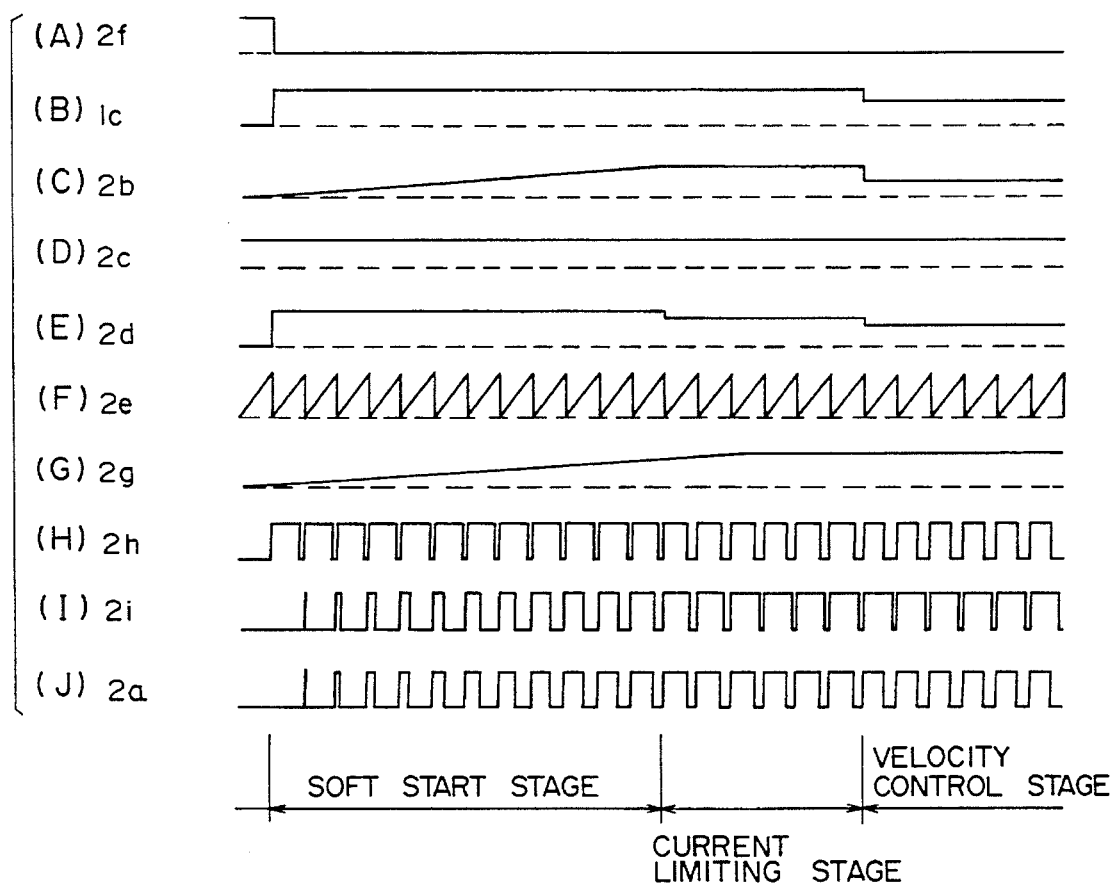
FIG. 12 is a waveform diagram of the pulse width modulation circuit shown in FIG. 6.
Figure 13:
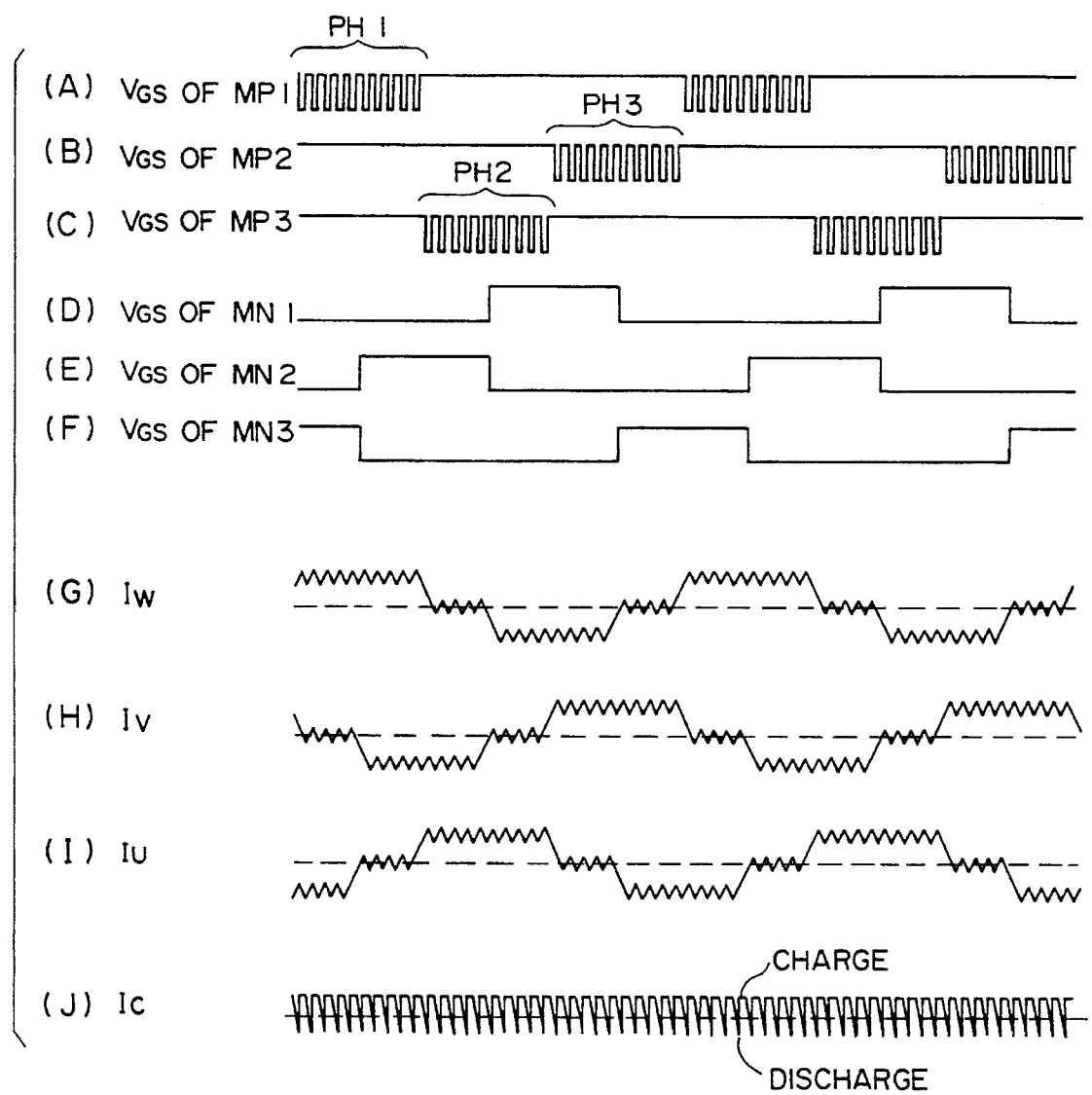
FIG. 13 is a waveform diagram of the switching unit shown in FIG. 9.

A description will now be provided as to the operation, with reference to FIGS. 12 and 13, of the motor driving device according to the embodiment of the present invention being considered.

The driving operation on the motor 5 is initiated by turning ON the motor start signal 2f as shown in part (A) of FIG. 12. The motor 5 is driven by three stages shown in FIG. 12, that is, a soft starting stage, a current limiting stage, and a velocity control stage.

At the commencement of the driving operation (soft starting stage), there is a large difference between the target velocity signal 1a and the rotation velocity signal 1b. Hence, as shown in part (B) of FIG. 12, the velocity control voltage 1c has the highest level. The smoothing circuit 26 shown in FIG. 6 outputs the driving current detection voltage 1b which gradually increases, as shown in part (C) of FIG. 12. The current limiting reference voltage 2c is fixed at a given level, as shown in part (D) of FIG. 12. As long as the driving current detection voltage 2b shown in part (C) of FIG. 12 is lower than the current limiting reference voltage 2c shown in part (D), the limiter circuit 27 shown in FIG. 6 allows the velocity limiting voltage 1c to pass therethrough. Hence, the velocity/current control voltage 2d is fixed, as shown in part (E) of FIG. 12.

The comparator 22 shown in FIG. 6 compares the voltage 2d with the triangular wave signal 2e shown in part (F) of FIG. 12, and produces the velocity/current limiting pulse signal 2h as shown in part (H) of FIG. 12. In the soft starting stage, the velocity/current control voltage 2d is constant, and hence the pulse width of the velocity/current control pulse signal 2h is also constant.

The soft start pulse signal 2i output by the time constant circuit 23 shown in FIG. 6 increases gradually, as shown in part (G) of FIG. 12. The comparator 23 shown in FIG. 6 compares the pulse signal 2i with the triangular wave signal 2e shown in part (F) of FIG. 12., and outputs the soft start pulse signal 2i as shown in part (I) of FIG. 12. As the voltage of the soft start signal 2g increases, the pulse width of the soft start pulse signal 2i becomes greater. In the soft start stage, the soft start pulse signal 2i is allowed to pass through the AND gate 24, so that the velocity control pulse signal 2a shown in part (J) of FIG. 12 can be obtained.

When the driving current detection voltage 2b becomes equal to or higher than the current limiting reference voltage 2c, the motor driving control operation shifts to the current limiting stage shown in FIG. 12. In this case, the limiter circuit 27 outputs the predetermined current limiting voltage instead of the velocity control voltage 1c, so that the velocity/current control voltage 2d is decreased in a stepwise formation, as shown in part (E) of FIG. 12. Hence, the pulse width of the velocity/current control pulse signal 2h becomes shorter, as shown in part (H) of FIG. 12, and the velocity control pulse signal 2a obtained by the AND operation on the pulse signals 2h and 2i is as shown in part (J) of FIG. 12.

Then, the motor driving control operation shifts to the velocity control stage, as shown in FIG. 12. At the interface between these two stages, the velocity control voltage 1c is decreased, as shown in part (B) FIG. 12, because the velocity of the motor 5 becomes close to the target velocity. Hence, the driving current detection voltage 2b is also decreased and becomes lower than the current limiting reference voltage 2c, as shown in part (C) of FIG. 12. Thus, the limiter circuit 27 applies the velocity control voltage 1c to the comparator 22 as the velocity/current control voltage 2d, which is thus decreased as shown in part (E) of FIG. 12. Hence, the pulse width of the velocity/current control pulse signal 2h becomes shorter, as shown in part (H) of FIG. 12. In the velocity control stage, the soft start pulse signal 2i has a sufficiently large pulse width, as shown in part (I) of FIG. 12. Hence, the pulse signal 2h is allowed to pass through the AND gate 24.

Referring to FIG. 13, there is illustrated the operation of the switching circuit 4 in the velocity control stage. The velocity control pulse signal 2a shown in part (J) of FIG. 12 is commonly applied to the bases of the bipolar transistors TR1, TR2 and TR3 shown in FIG. 8. As shown in parts (A), (B) and (C) of FIG. 13, which show the gate-source voltages $V_{GS}$ of the transistors MP1, MP2 and MP3, respectively, the current-flow switching signals 3b applied to the transistors TR1 through TR3 are sequentially set to the low level during periods PH1, PH2 and PH3 in this order. In the periods PH1, PH2 and PH3, the transistors MP1, MP3 and MP2 perform the switching operation, as shown in parts (A), (B) and (C) of FIG. 13.

The other current-flow switching signals 3b applied to terminals #2, #5 and #8 of the switching unit 41 are changed as shown in parts (D), (E) and (F) of FIG. 13. Hence, driving currents $I_W$, $I_V$ and $I_U$ flowing in the coils W, V and U of the motor 5 are as shown in parts (G), (H) and (I). The capacitor 55 is discharged and charged each time one of the transistors MP1, MP2 and MP3 is turned ON and OFF, as shown in part (J) of FIG. 13. Hence, it is possible to absorb the counter current from the switching unit 41 and prevent it from flowing into the power supply (not shown) via the power supply terminal 52.

In the above operation, the circuits 25, 26 and 27 shown in FIG. 6 function as follows. If the coils W, V and U of the motor 5 have a small resistance in a case where the circuits 25–27 are not used, a large current will flow therein when initiating the motor and these coils and/or the switching unit 41 may be damaged. The current flowing in the capacitor 55 is proportional to the driving current, and the allowable ripple current is proportional to the capacitance (size) of the capacitor 55. Hence, the capacitor 55 is needed to have a larger capacitance as the driving current increases. However, such a large capacitance element is expensive and is of a large size. Further, the capacitor 55 occupies a large mounting area on the circuit board.

When the circuits 25,–27 are used, the capacitor 55 is not needed to have a capacitance as large as described above. In addition, it is possible to avoid the coils W, V and U or the switching unit 41 from being damaged. This is because the driving current is limited when the driving current detection voltage 2b is equal to or higher than the current limiting reference voltage 2c, as has been described previously. In addition, the circuit board on which the capacitor 55 is mounted can be down-sized.

As has been described previously, the time constant circuit 28, the comparator 23 and the AND gate 24 are provided in order to prevent a large driving current from flowing in the coils of the motor 5 when initiating the motor 5. As has been described, the pulse width of the velocity control pulse signal 2a is gradually increased after the motor 5 is initiated. Hence, it is possible to prevent the coils W, V and U or the switching unit 41 from being damaged.

It is preferable that the modulation frequency of the pulse width modulation circuit 2 be determined taking into account the following. The modulation frequency serves as noise if it falls within the audible frequency range (20 Hz–20 kHz) of human beings. Further, as the modulation frequency becomes higher, the counter electromotive force and electromagnetic interference takes place increasingly. With the above in mind, it is desirable that the modulation frequency of the pulse width modulation circuit 2 be approximately equal to 20 kHz. With the modulation frequency approximately equal to 20 kHz, it is possible to suppress a large counter electromotive voltage, electro-magnetic interference and/or beat sound of the motor.

Figure 14:
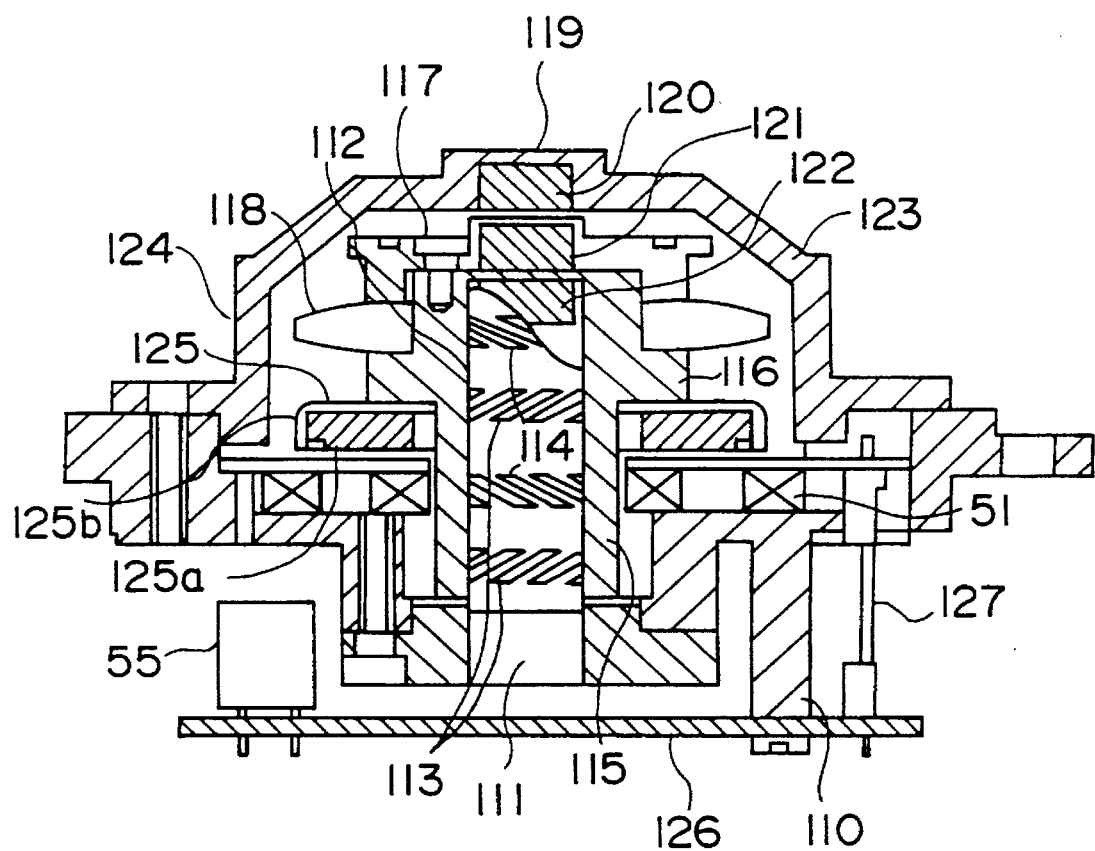
FIG. 14 is a cross-sectional view of a scanner motor using a DC brushless motor according to the embodiment of the present invention.

FIG. 14 is a cross-sectional view of a DC brushless motor which is integrally provided with a polygon scanner and the aforementioned DC brushless motor driving device. Such a DC brushless motor is also called a scanner motor. The DC brushless motor shown in FIG. 14 has a housing 110 in which a stationary shaft 111 standing vertically in the center of the housing 110 is provided. A radial bearing surface 112 (dynamic pressure air bearing) is provided on the circumferential outer surface of the stationary shaft 111. A pair of herring-bone grooves 113 and a pair of herring-bone grooves 114 are formed on the radial bearing surface 112 and arranged at equal intervals in the circumferential direction. The grooves 113 and 114 are used to generate a dynamic pressure.

The radial bearing surface 112 faces the circumferential inner surface of a cylindrical rotary shaft 115 and is spaced apart therefrom at a given interval. Thereby, the rotary shaft 115 can rotate with respect to the stationary shaft 111. A mirror receiving flange 116 is formed in the upper portion of the rotary shaft 115, to which a mirror pressure member 117 and a polygon mirror 118 are attached. The mirror pressure member 117 holds a magnet 121 located in the center hereof. The magnet 121 forms an axial magnetic bearing 119. The axial magnetic bearing 119 is made up of three magnets 120, 121 and 122 that repel each other on the axial line of the stationary shaft 111. The magnet 120 is attached to an upper case 123 above the magnet 121. The magnet 122 is fixed to the upper end of the stationary shaft 111. Hence, a rotary body made up of the rotary shaft 115, the mirror pressure member 117, the polygon mirror 118 and the magnet 121 is urged so that it floats upwards and is supported in the non-contact formation.

The polygon mirror 118 is driven by an axial-gap-type, face-to-face brushless motor (motor main body) 124. The motor 124 includes a rotator magnet assembly 125 fixed to the rotary shaft 115, driving coils 51, and Hall elements (which do not appear in FIG. 14). The driving coils 51 are spaced apart from the lower surface of the rotator magnet assembly 125, and are arranged at predetermined intervals in the axial direction. A field magnet 125a of the rotator magnet assembly 125 is integrally attached to the rotary shaft 115 by means of a yoke 125b. The driving coils 51, which corresponds to the aforementioned coils W, V and U, are attached to a horizontal surface of the housing 110. The housing 110 is mounted to a circuit board 126 such as a printed circuit board, and is fixed thereto by means of screws (only one screw is illustrated in FIG. 14). The driving coils 51 are electrically connected to a circuit formed on the circuit board 126 via wiring lines 127.

The housing 110 has a lower recess portion below which the aforementioned capacitor 55 mounted on the circuit board 126 can be located. Further, the circuit of the DC brushless motor driving device is formed on the circuit board 126.

According to the assembly shown in FIG. 14, the DC brushless motor and its driving device are approximately integrally structured, so that the wiring lines 127 can be sufficiently short and thus the occurrence of electro-magnetic interference due to high-speed switching can be suppressed.

In practice, it is necessary to optimize the parameters of the switching unit 41, more particularly, the parameters of the field effect transistors MP1, MP2, MP3, MN1, MN2 and MN3. When the DC motor 5 is continuously rotating at a relatively high velocity, a relatively large switching loss will occur in the field effect transistors. Such a switching loss results in heat generation and the reliability of the motor driving device may be degraded.

Figure 15:
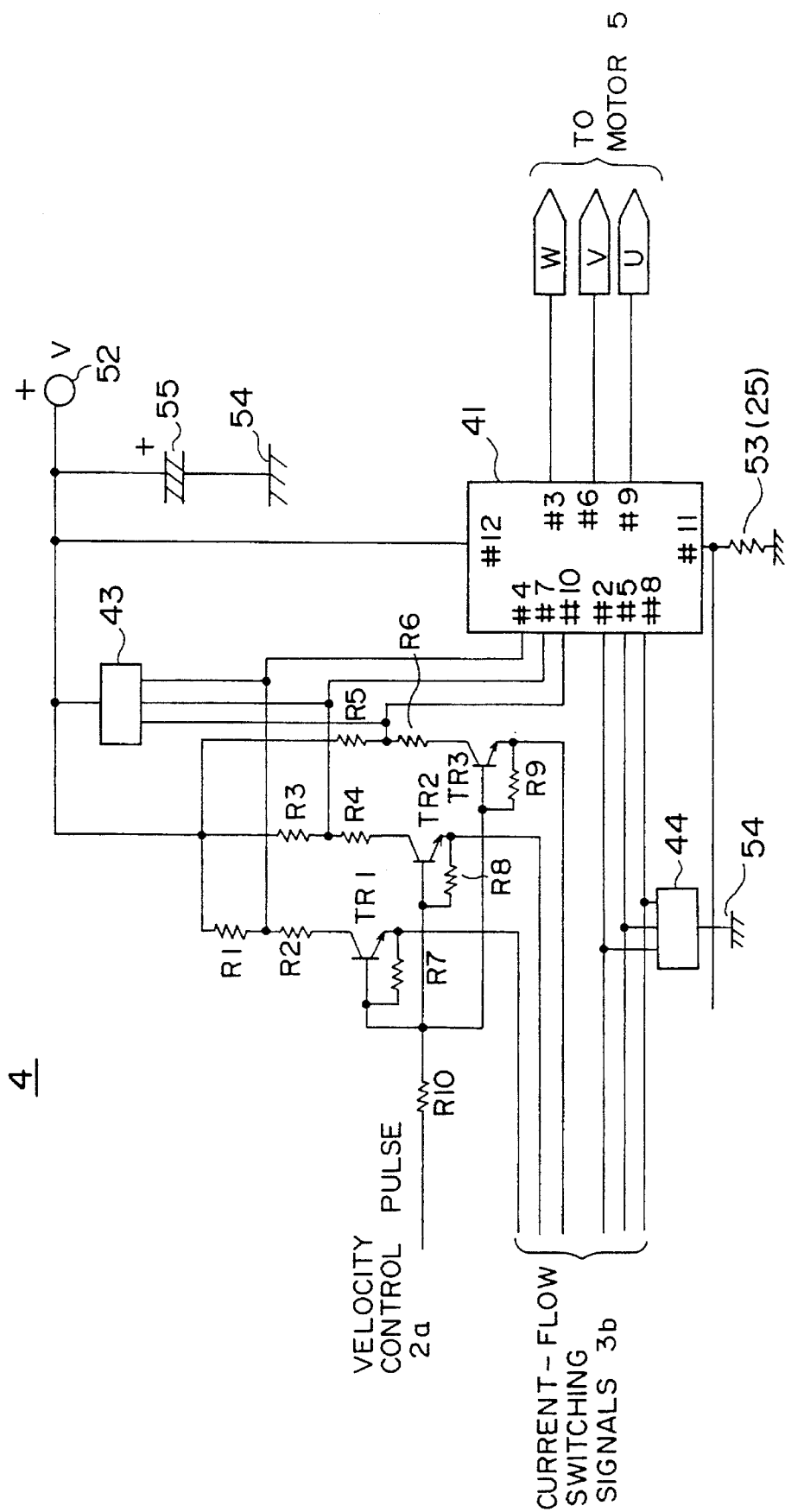
FIG. 15 is a circuit diagram of a variation of the switching unit shown in FIG. 9.

FIG. 15 is a block diagram of the switching circuit having a configuration which is designed taking into account the above and is different from the configuration shown in FIG. 8. In FIG. 15, parts that are the same as those shown in FIG. 8 are given the same reference numbers.

The MOS field effect transistor is a voltage driven transistor which operates when applying a potential difference equal to a few volts across the gate and source thereof. There is an insulating film between the input part and output part of the MOS field effect transistor. Such an insulating film results in an input capacitance between 300 pF and 1000 pF. Unless such an input capacitance is charged and discharged at a high speed, the MOS field effect transistor will generate heat and its driving ability and reliability will be degraded.

The switching circuit 4 shown in FIG. 15 has a charge/discharge circuit 43 and a charge/discharge circuit 44, which are added to the circuit configuration shown in FIG. 8. More particularly, the charge/discharge circuit 43 functions to charge the input capacitances of the field effect transistors MP1, MP2 and MP3 respectively connected between terminal #12 and terminals #4, #7 and #10 of the switching unit 41 and to discharge the above input capacitances. The charge/discharge circuit 44 functions to charge the input capacitances of the field effect transistors MN1, MN2 and MN3 respectively connected to terminal #11 and terminals #2, #5 and #8 of the switching unit 41 and to discharge the above input capacitances. Hence, the charging and discharging operation on the field effect transistors of the switching unit 41 can be performed at a high speed. Hence, it becomes possible to reduce generation of heat in the field effect transistors and ensure a high driving ability and high reliability.

Figure 16:
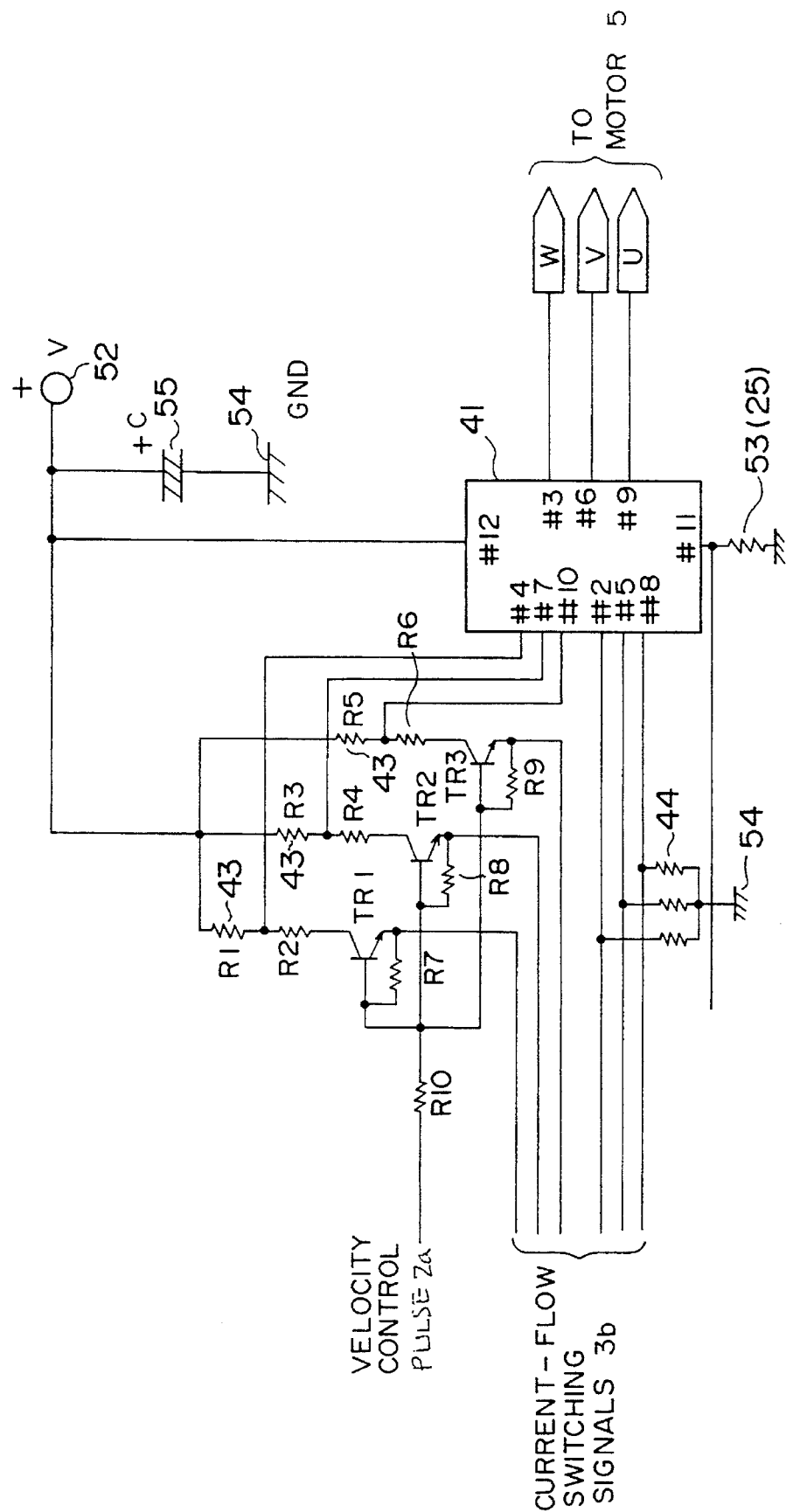
FIG. 16 is a circuit diagram of the structure of the switching unit shown in FIG. 15 in more detail.

FIG. 16 shows an example of the charge/discharge circuits 43 and 44. The aforementioned resistors R1, R3 and R5 used to generate the driving voltages of the transistors MP1, MP2 and MP3 also function as the charge/discharge circuit 43. The resistors R1, R3 and R5 develop a potential difference equal to a few volts across terminal #12 and terminals #4, #7 and #10 when turning ON the corresponding field effect transistors. When the field effect transistors MP1, MP2 and MP3 are turned OFF, the input capacitances are discharged via the resistors R1, R3 and R5.

Similarly, the charge/discharge circuit 44 is formed by resistors respectively connected between terminal #11 and terminals #2, #5 and #8. These resistors develop a potential difference equal to a few volts across terminals #2, #5 and #8 and terminal #11 when turning ON the corresponding field effect transistors. When the field effect transistors MN1, MN2 and MN3 are turned OFF, the input capacitances are discharged via the resistors of the circuit 44.

Figure 17:
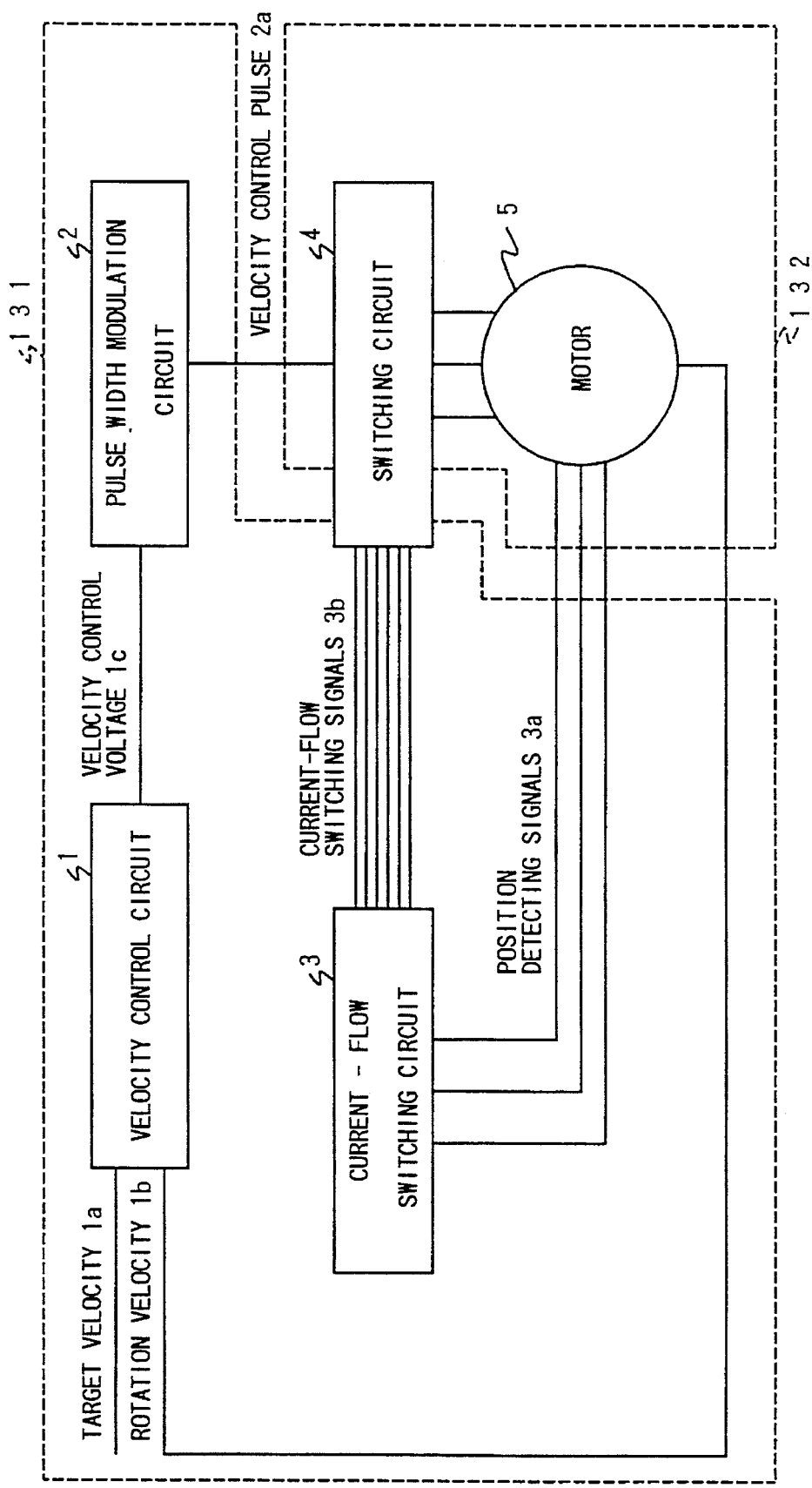
FIG. 17 is a block diagram of a variation of the structure shown in FIG. 4.

FIG. 17 is a block diagram of a variation of the structure shown in FIG. 4. In FIG. 17, parts that are the same as those shown in FIG. 4 are given the same reference numbers.

The motor driving device shown in FIG. 17 is segmented into two parts, that is a signal processing system 131 and a driving current carrying system 132. The signal processing system 131 includes the velocity control circuit 1, the pulse width modulation circuit 2, the current-flow switching circuit 3, and a part of the switching circuit 4. The driving current carrying system 132 includes the remaining part of the switching circuit 4.

The systems 131 and 132 are driven by different power supply voltages. For example, the signal processing system 131 is supplied with a power supply voltage of, for example, 4–5 V, and the driving current carrying system 132 is supplied with a power supply voltage of, for example, 12 V or 24 V. Hence, it is possible to miniaturize electronic devices of the signal processing system 131, such as semiconductor elements and resistors and to reduce the size of the entire driving device as well as the production cost.

The field effect transistors of the switching unit 41 are driven by the gate-source voltage $V_{GS}$ set equal to 4–5 V. The power consumed in each of the resistors of the charge/discharge circuits 43 and 44 is defined by the following formula (2):

$$W=V_{GS}^2/R \qquad (2)$$

where W is the power consumed in each resistor, VGS is the gate-source voltage of each field effect transistor, and R is the resistance of each resistor. The tolerable power of each resistor in the circuits 43 and 44 is set equal to or less than ⅛ or ⅒ watts, which is the tolerable power of a standard chip resistor, the mounting area for each resistor can be reduced, and down-sizing and cost reduction of the motor driving device can be achieved. That is, it is desirable that the resistance of each resistor satisfies the following condition (3):

$$1/8 \geq V_{GS}^2/R \qquad (3).$$

When $V_{GS}=5$ V, then $R \geq 5^2 \times 8$ Ω, that is, $R \geq 200$ Ω.

Meanwhile, the charging/discharging time for the input capacitance C is defined by the following equation (4):

$$t=CR \qquad (4)$$

where t is the charging/discharging time, and R is the resistance of each resistor. It can be seen from equation (4) that the charging/discharging time can be reduced as the resistance of the resistor R is reduced. When the field effect transistors of the switching unit 41 are driven at a frequency of about 20 kHz (one period is equal to 50 μsec), the charging/discharging time t is preferably set equal to 1/50–1/100 of the period 50 μsec. Under the above condition, the field effect transistors do not generate a large amount of heat, and the reliability of the device can be ensured. In short, the resistance of each resistor in the charging/discharging circuits 43 and 44 is determined so that the following condition (5) can be satisfied (when t=1/50 of the period 50 μsec):

$$50 \times 10^{-6}/50 \geq CR \qquad (5).$$

When the input capacitance C of the MOS field effect transistor is equal to 1000 pF, the condition (5) can be rewritten into:

$$R \leq 1 \times 10^{-6}/C$$

$$R \leq (1 \times 10^{-6})/(1000 \times 10^{-12})$$

$$R \leq 1000 \text{ Ω} \qquad (6).$$

As a result, the resistance of each resistor in the circuits 43 and 44 is selected so that the following condition is satisfied:

$$200 \text{Ω} \leq R \leq 1000 \text{ Ω}.$$

In this case, the DC brushless motor driving device that consumes a power of a few watts to 30 watts can be made compact because each resistor in the circuits 43 and 44 consumes only ⅛ watts as long as the resistance of each resistor satisfies the above condition.

Figure 18:
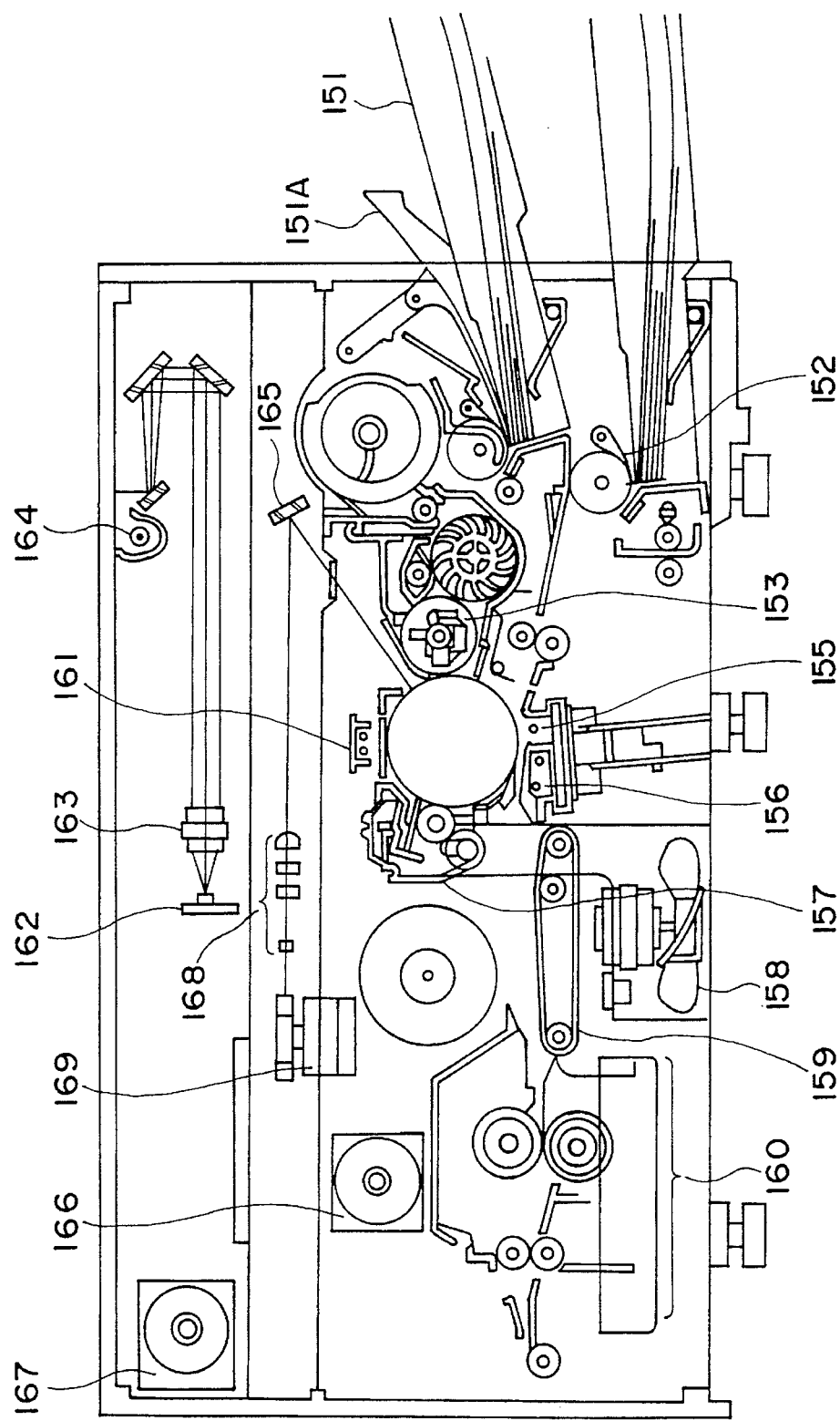
FIG. 18 is a cross-sectional view of an image forming device to which the DC brushless motor driving device according to the embodiment of the present invention is applied.

FIG. 18 is a cross-sectional view of an image forming device to which the polygon motor and the DC brushless motor driving device according to the present invention are applied. More particularly, the device shown in FIG. 18 is a printing machine, which includes paper cassettes 151, a hand-feed paper cassette 151A, paper rollers 152, a developing roller 153, a photosensitive drum 154, an image transfer charger 155, a paper detaching charger 156, a cleaning unit 157, a transfer fan 158, a main motor unit 159, a fixing unit 160, and an electrifying charger 161. The above structural elements are known and thus a detailed description thereof will now be omitted for the sake of convenience.

Further, the printing machine shown in FIG. 18 includes an image reading plate 162, a lens 163, a fluorescent lamp 164, a mirror 165, a main body fan 166, a scanner power supply fan 167, and an fθ lens 168. These structural elements are also known.

Figure 19:
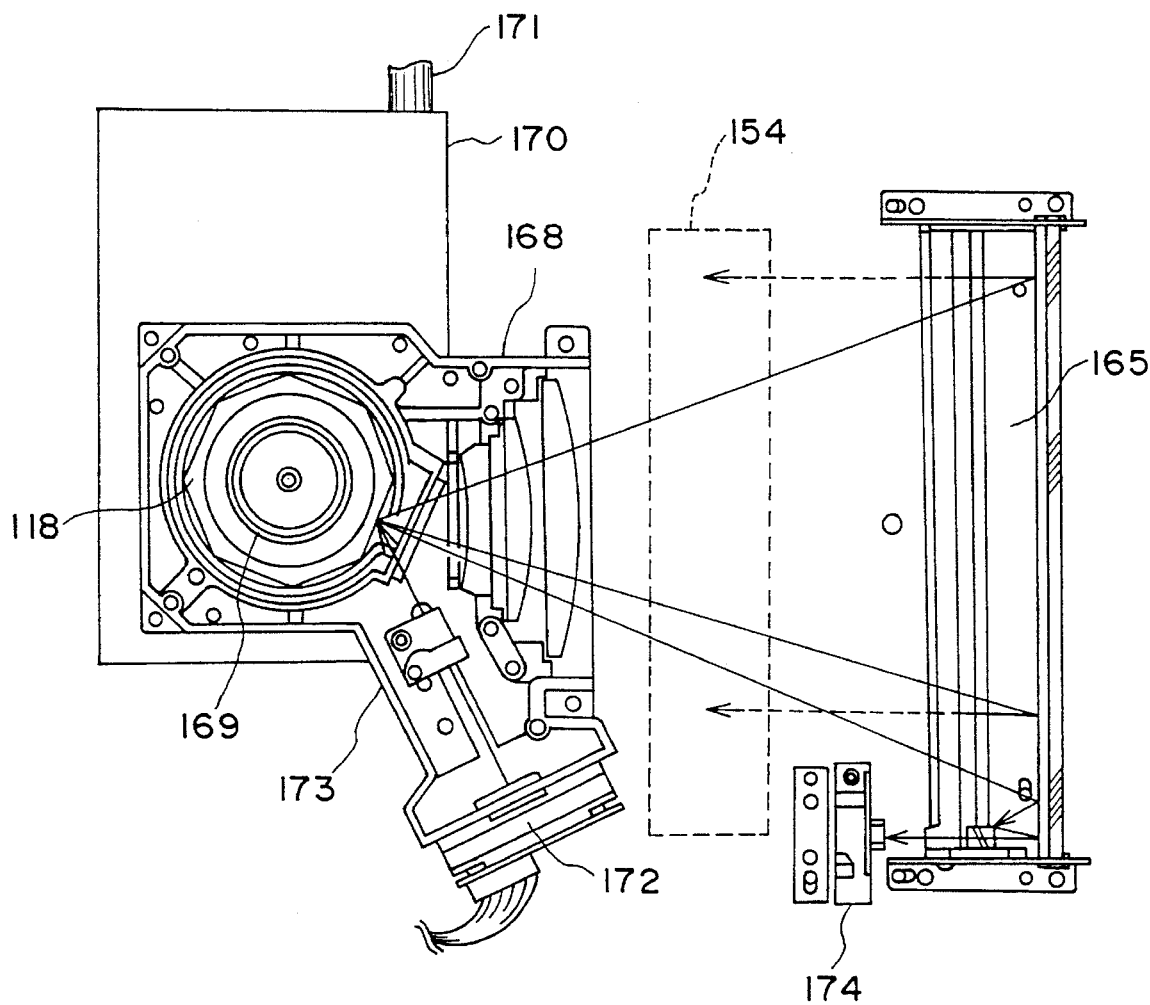
FIG. 19 is a plan view of a part of the image forming device shown in FIG. 18.

A polygon motor 169 has the structure shown in FIG. 14. As shown in FIG. 19, the polygon motor 169 is integrated with an optical system including the fθ lens 168, a laser diode unit 172, and a cylindrical lens 173, and a circuit board 170. The circuit board 170 corresponds to the circuit board 126 shown in FIG. 14. The polygon motor 169, the capacitor 55 and the driving device are mounted and formed on the circuit board 170 from which a cable carrying signals and a power supply extends. The board 170 is not shown in FIG. 18 for the sake of simplicity.

A laser beam modulated by read information is emitted from the laser diode unit 172 and is then reflected by the polygon mirror 118. The reflected laser beam passes through the fθ lens 168 and is then reflected by the mirror 165. Then, the reflected laser beam is projected onto the drum 154 on which an electrostatic latent image is formed. Part of the reflected laser beam enters a synchronization detecting unit 174 used to establish synchronization in the scanning operation.

The image forming device according to the present invention includes not only the copying machines, but also other machines including polygon mirrors.

The present invention is not limited to the specifically disclosed embodiments, and variations and modifications may be made without departing from the scope of the present invention.

What is claimed is:

1. A device for driving a DC motor comprising:
    a velocity control circuit generating a velocity control signal based on a difference between a target velocity of the DC motor and a current velocity thereof;
    a modulation circuit deriving a velocity control pulse signal having a pulse width modulated by the velocity control signal;
    a switching circuit performing a switching operation in which a driving current in a pulse formation corresponding to said velocity control pulse signal is sequentially applied to driving coils of the DC motor from a power supply terminal to which a power supply voltage is applied in accordance with a switching signal; and
    a current-flow switching circuit generating the switching signal on the basis of a current position of a rotator of the DC motor,
    said switching circuit including:

field effect transistors performing said switching operation; and a capacitor coupled between said power supply terminal and a reference potential, said capacitor absorbing a counter current caused in the driving coils due to the switching operation.

2. The device as claimed in claim 1, wherein the pulse width modulation circuit comprises a limiter circuit so that the velocity control pulse signal will have a pulse width less than that corresponding to said difference when the driving current flowing in the driving coils is greater than a reference value.

3. The device as claimed in claim 1, wherein the pulse width modulation circuit comprises a circuit which controls the velocity control pulse signal to a pulse width which gradually increases after the DC motor is started by applying the driving current to the driving coils.

4. The device as claimed in claim 1, further comprising a charge/discharge circuit which charges and discharges input capacitances coupled between gates and sources of the field effect transistors.

5. The device as claimed in claim 4, wherein said charge/discharge circuit comprises first resistors connected to the gates of the field effect transistors and said power supply terminal, and second resistors connected to the gates of the field effect transistors and said reference potential.

6. The device as claimed in claim 1, wherein the velocity control circuit, the pulse width modulation circuit and the current-flow switching circuit are driven by another power supply voltage different from that applied to said power supply terminal.

7. The device as claimed in claim 1, wherein a modulation frequency, at which the pulse width of the velocity control pulse signal is modulated by the velocity control signal, is approximately 20 kHz.

8. The device as claimed in claim 1, wherein the driving coils of the DC motor comprise armature windings and said capacitor is charged and discharged with a period shorter than a winding switch interval.

9. A DC motor comprising:

a DC motor main body;

a circuit board to which the DC motor main body is supported; and a device that drives the DC motor main body and is mounted on said circuit board, said device comprising:

a velocity control circuit generating a velocity control signal based on a difference between a target velocity of the DC motor and a current velocity thereof;

a modulation circuit deriving a velocity control pulse signal having a pulse width modulated by the velocity control signal;

a switching circuit performing a switching operation in which a driving current in a pulse formation corresponding to said velocity control pulse signal is sequentially applied to driving coils of the DC motor from a power supply terminal to which a power supply voltage is applied in accordance with a switching signal; and a current-flow switching circuit generating the switching signal on the basis of a current position of a rotator of the DC motor, said switching circuit including:

field effect transistors performing said switching operation; and a capacitor coupled between said power supply terminal and a reference potential, said capacitor absorbing a counter current caused in the driving coils due to the switching operation.

10. The DC motor as claimed in claim 9, wherein said capacitor is mounted on the circuit board and is located below the DC motor main body.

11. The DC motor as claimed in claim 9, further comprising a polygon mirror attached to a shaft of the DC motor main body.

12. The DC motor as claimed in claim 9, wherein the pulse width modulation circuit comprises a limiter circuit so that the velocity control pulse signal will have a pulse width less than that corresponding to said difference when the driving current flowing in the driving coils is greater than a reference value.

13. The DC motor as claimed in claim 9, wherein the pulse width modulation circuit comprises a circuit which controls the velocity control pulse signal to a pulse width which gradually increases after the DC motor is started by applying the driving current to the driving coils.

14. The DC motor as claimed in claim 9, further comprising a charge/discharge circuit which charges and discharges input capacitances coupled between gates and sources of the field effect transistors.

15. The DC motor as claimed in claim 14, wherein said charge/discharge circuit comprises first resistors connected to the gates of the field effect transistors and said power supply terminal, and second resistors connected to the gates of the field effect transistors and said reference potential.

16. The DC motor as claimed in claim 9, wherein the velocity control circuit, the pulse width modulation circuit and the current-flow switching circuit are driven by another power supply voltage different from that applied to said power supply terminal.

17. The DC motor as claimed in claim 9, wherein a modulation frequency, at which the pulse width of the velocity control pulse signal is modulated by the velocity control signal, is approximately 20 kHz.

18. An image forming device comprising:

a photosensitive member; and an optical system that forms an image on the photosensitive member by projecting a light beam thereon, said optical system comprising:

a light source;

a polygon mirror reflecting the light beam emitted from the light source; and a DC motor rotating the polygon mirror, said DC motor comprising:

a DC motor main body;

a circuit board to which the DC motor main body is supported; and a device that drives the DC motor main body and is mounted on said circuit board, said device comprising:

a velocity control circuit generating a velocity control signal based on a difference between a target velocity of the DC motor and a current velocity thereof;

a modulation circuit deriving a velocity control pulse signal having a pulse width modulated by the velocity control signal;

a switching circuit performing a switching operation in which a driving current in a pulse formation corresponding to said velocity control pulse signal is sequentially applied to driving coils of the DC motor from a power supply terminal to which a power supply voltage is applied in accordance with a switching signal; and a current-flow switching circuit generating the switching signal on the basis of a current position of a rotator of the DC motor, said switching circuit including:
  field effect transistors performing said switching operation; and a capacitor coupled between said power supply terminal and a reference potential, said capacitor absorbing a counter current caused in the driving coils due to the switching operation.

* * * * *